Aug. 11, 1936.     B. STALLARD     2,050,633
CONSTANT TEMPERATURE DEVICE
Filed June 9, 1931
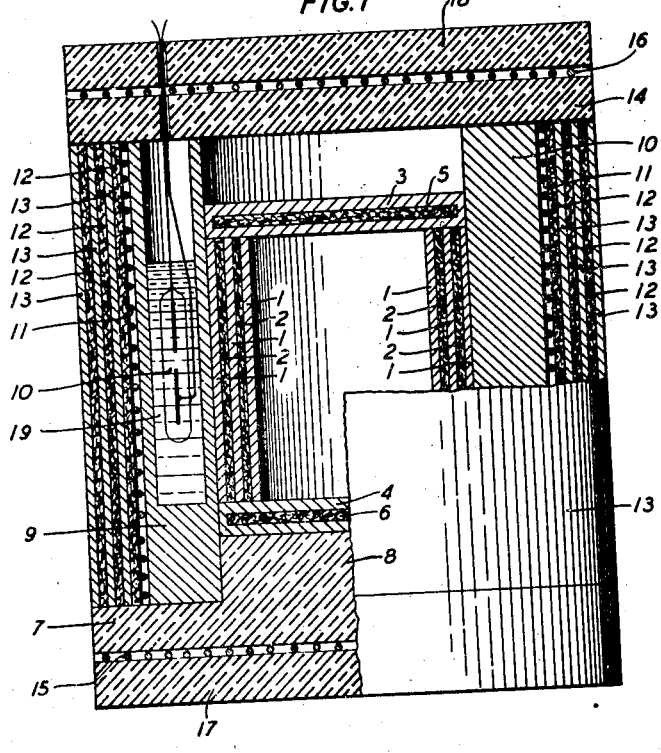
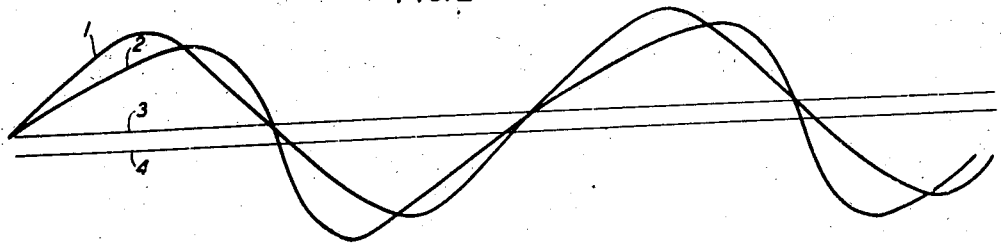
INVENTOR
B. STALLARD
BY
ATTORNEY Patented Aug. 11, 1936

2,050,633

UNITED STATES PATENT OFFICE

2,050,633

CONSTANT TEMPERATURE DEVICE

Burrell Stallard, Bloomfield, N. J., assignor to Bell Telephone Laboratories, Incorporated, New York, N. Y., a corporation of New York Application June 9, 1931, Serial No. 543,092

8 Claims. (Cl. 219—19)

This invention relates to constant temperature devices, and has particular reference to the precision control of the temperature of a frequency standard, such as a tuning fork or piezo-electric crystal.

In order to provide a uniformly distributed temperature for such a standard it has heretofore been customary to immerse the constant temperature oven in a bath of a liquid which was kept in circulation. This method is cumbersome and subject to the disadvantages of any system where moving parts are used in precision apparatus which is designed to operate over a long period of time.

An object of this invention is to provide improved means for avoiding the effects of air currents and room temperature variations in the thermal control of a constant temperature oven.

In constant temperature apparatus, due to the thermal lag of the responding element, or for other reasons, there is always an over-shooting of the temperature before the controlling devices operate to restore equilibrium, and at different ambient temperatures this over-shooting effect is uneven.

A further object of this invention is to provide improved means whereby uneven over-shooting may be compensated.

This invention is closely related to an invention disclosed in a copending application of Warren A. Marrison application Serial No. 278,570, filed May 17, 1928, which issued as Patent No. 1,940,599 on December 19, 1933, the physical relation of controlled space, heater and responding element being in general as therein disclosed. That is, the assembly comprises, together with other features novel to applicant to be described, a container having side and end walls, with a heating, winding and responding element in thermally conductive relation within the side walls, and therefore spaced by portions of the side wall thickness from the controlled space and the ambient atmosphere. A constant temperature oven, such as is disclosed by Marrison, that is, one in which the heating element was surrounded by a layer of insulation only, was placed in direct line with the draft from an electric fan with the side opposite the temperature responding element toward the draft. The temperature of the controlled device dropped about 2° C. in a few minutes and remained at that temperature. When the oven was turned around so the responding element was toward the fan the temperature increased about 4° C. in a few minutes so as to be about 2° C. higher than normal. When the insulating envelope was replaced by a casing about ¾ inch thick consisting of several alternate layers of equal thicknesses of a good heat conducting material and a good heat insulating material and the experiment was repeated there was a difference of temperature of only about .05° C., and this difference occurred only after several hours. The condition of the experiment was very much worse than would be encountered in actual operation. By increasing the thickness of the casing the effect could be made as small as desired.

The necessary and sufficient condition in order to equalize the ambient temperature and air current conditions is a low direct conductivity in proportion to the lateral conductivity, that is, a low ratio of conductivity through the layers to the conductivity along the layers. The following are certain relative thermal conductivities for a certain casing embodying the invention and comprising the materials named:

| | |
|---|---:|
| Copper | 1.00 |
| Felt (approximate) | 0.000087 |
| Direct conductivity through casing comprising equal layers of copper and felt | 0.000174 |
| Lateral conductivity of same casing | 0.5 |
| Ratio | 0.000348 |

Whatever materials are used the smallest ratio will be obtained by using layers of equal thicknesses of each material.

From a theoretical standpoint the most desirable shape for an oven embodying the above principles is spherical. For practical considerations, however, a cylindrical shape is desirable. For a cylindrical shape, certain effects must be taken into account. If insulation only is used at the ends the temperature of the inside space will be appreciably lower than the temperature at the responding element. The formula for the flow of heat through a medium is $$H = K \frac{(T_1 - T_2)}{t} a$$

where
H is the rate of flow of the heat
K is the thermal conductivity of the medium
$a$ is the area
$t$ is the thickness
$T_1$ is the temperature on one side, and
$T_2$ is the temperature on the other.
Therefore, the amount of heat conducted out through an end will be a function of the room temperature $T_2$. This will affect the temperature in the space to be controlled. If the end insulation is still used and end heating coils are introduced and maintained at a temperature approximately that of the side heating coil, the temperature gradient $$\frac{T_1 - T_2}{t}$$

across the end insulation between the inside space and the end heating coils will be greately decreased thereby greatly decreasing the flow of heat H through these end sections. By having alternate layers of a good and a poor conductor between the end heating coils and the controlled space, the end portions of the casing can be made good insulators in the direction outward through the ends and good conductors in perpendicular directions. This will tend to cause the insides of the plugs to have nearly the same temperature as that of the responding element.

The phenomenon of over-shooting of the temperature has been heretofore referred to. When the responding element reaches a certain temperature it will reduce or interrupt the heater current. Then when the responding element cools to a slightly lower temperature it will increase or start the heater current. Due largely to the thermal capacity of the responding element and the thermal resistance between the heater and responding element the temperature near the heater will rise and fall faster and also higher and lower than the temperature of the responding element. This will cause the temperature of the responding element to rise above and fall below the operating limit of the responding element. Thus the temperature of the responding element overshoots its operating limit. At a given room temperature the temperature of the control space inside the attenuating material will approach a constant value related to the average value of the temperature of the responding element. If the room temperature is reduced the apparatus will cool faster than it will heat. The temperature of the responding element will then lag farther behind the temperature of the heater during cooling and less during heating so that the temperature of the responding element will overshoot farther during cooling and not as far during heating as when the room is warmer. This causes the overshooting to be uneven and to vary with the room temperature. Thus the average temperature of the responding element and therefore the temperature of the control space inside the attenuating material will be lower when the room temperature is lower. By placing the responding element in as good thermal contact with the heating element as possible the lag will be less and the effect of over-shooting will be partially overcome. Also, the period of operation of the responding element will be shortened and the heat variation will require less attenuation. This good thermal contact may be made by filling the hole in which the responding element is located with some substance having a high heat conductivity such as mercury.

A method of compensating the effect of uneven over-shooting due to lower room temperature is to increase the amount of power in the end heating coils so that they are at a slightly higher temperature than the coil around the walls of the cylinder. Since the end heating coils are farther away from the responding element than the heating coil around the walls there is a correspondingly greater thermal impedance between these end heaters and the responding element than between the heater around the sides and the responding element so that the temperature of these end heating coils will have less effect upon the responding element than the temperature of the heater around the sides. The higher temperature of the end heaters will cause a flow of heat in from the ends. The lower the room temperature the greater proportion of the time the heater will be on, the greater the increment of heat supplied by the end heating coils, and the higher the temperature of the inside space as compared with that of the responding element. Thus the heating temperatures of the different coils can be adjusted until the uneven over-shooting effect is exactly compensated.

In the drawing, Fig. 1 is an elevation of the constant temperature device partly in section; and Fig. 2 shows a series of curves illustrating the compensation of uneven over-shooting of the temperature responding apparatus with lower room temperatures.

In Fig. 1 there is a cylindrical casing consisting of alternate layers 1, 2 of substances one having a high thermal conductivity and a high heat storing capacity and the other a low thermal conductivity, respectively, such as copper and felt. At the end of this casing there are two plugs 3, 4 of conducting material, each having embedded therein a layer of insulating material, 5 and 6 respectively, such as felt, in order to prevent loss of heat through the ends of the device, as explained above. The plug 4 rests on the raised center section 8 of an insulating support 7. Resting on the support 7 and surrounding the casing just described, is a cylinder of conducting material 9 such as aluminum. A mercury responding element 10 is mounted in a hole in the cylinder 9 and is surrounded by a material 19 having good heat conducting properties such as mercury, litharge, or perhaps glycerine, in order to provide good thermal contact between the cylinder 9 and the responding element 10. A heating winding of resistance wire 11 is wound around the metallic cylinder 9. A second cylindrical casing consisting of alternate layers 12, 13 of a good heat insulating material and a good heat conducting material, respectively, surrounds the resistance wire 11. An insulating disc 14 rests on the top of the concentric cylinders just described, and may be secured thereto in any suitable manner (not shown). End heating coils 15, 16 are placed next to the support 7 and disc 14 respectively, and base 17 and head 18 are placed over the coils 15, 16 respectively.

In Fig. 2, curve 1 is a graph of temperature plotted against time at the responding element for a given room temperature. The average temperature of the inner space whose temperature is to be kept constant, is shown by the curve 3. If the room temperature should lower, the rate of cooling when the heating circuit is cyclically opened responsively to the operation of the thermostat, will increase and the rate of heating during the complementary partions of the cycle, will decrease. This will cause the temperature variation at the responding element to change to the form of curve 2. Since the rate of cooling is greater than before, the leg in temperature of the responding element will be greater than before in cooling while the reverse is true in heating. The average temperature of the inner space to be controlled after attenuation will then be that indicated by curve 4, which is lower than with higher room temperature. This effect may be compensated by providing end heating coils as shown, and so controlling them that the temperature of the ends of the cylinder is slightly higher than the average temperature at the responding element. This will cause a flow of heat in from the ends. The lower the room temperature, the proportionately greater this amount will be. Therefore, the lower the temperature of the inner controlled space tends to be due to the heating effect of the coil around the cylinder 9 as modified by changes in room temperature, the greater will be the amount of heat supplied thereto by the end heating coils. By adjusting the relative temperatures of the end heating coils and the side heating coils the amount of additional heat supplied by the end heating coils may be made to compensate for the overshooting effect at lower room temperatures so that the temperature of the inner controlled space remains constant with varying room temperatures.

What is claimed is:

1. A constant temperature oven comprising a container, a heating element adjacent to said container, temperature responsive means within the walls of said container connected to said heating element, and a thermal casing surrounding said container and heating element having a relatively poor thermal conductivity through said casing and a relatively high thermal conductivity around said casing which comprises alternate layers of heat conducting and non-conducting materials.

2. A constant temperature oven comprising a container having side and end walls, heating elements associated with the side walls and ends of said container, temperature responsive means in intimate contact with the side walls of said container for controlling said heaters, and means for compensating for changes in the average temperature of said container due to uneven overshooting which comprises means for supplying more heat to the heaters associated with the ends of said container so that they are at a slightly higher temperature than those associated with the side walls of said container.

3. In a constant temperature oven having a thermally insulated container with side and end walls, end and side wall heaters associated therewith, and temperature responsive means associated with the side walls of said container, means for compensating for changes in the average temperatures within said container due to the thermal capacity of said temperature responsive means and thermal resistance between said responsive means and said container which comprises means for heating the end heaters of said container to a slightly higher temperature than the temperature of the side wall heaters of said container.

4. In a constant temperature device having a hollow container with side and end walls, a plurality of heating elements associated with said ends and said side walls of said container, a temperature responsive element in the side walls of said container for controlling said heating elements, means for reducing temperature variations of said container due to uneven overshooting which comprises means for supplying more heat to the heating elements associated with the ends than is supplied to the heating elements associated with the side walls of said container so that said end heating elements are at a slightly higher temperature than the temperature of said side wall heating elements.

5. In a constant temperature device in accordance with claim 4 having means for avoiding variations in the temperature of said container due to variations in the ambient temperature at different points on the surface of said device which comprises surrounding said container and heating elements with alternate layers of a thermal insulator and a thermal conductor.

6. A constant temperature device comprising a hollow container, a temperature responsive element of low thermal capacity, means having low thermal impedance for connecting said temperature responsive element to said container, a plurality of heating elements adjacent said container having different thermal impedances between the various heating elements and said temperature responsive element, means for controlling said heating elements by said temperature responsive element, and means for reducing the temperature variations of said container due to the thermal lag of said temperature responsive element which comprises means for heating said heating elements having high thermal impedances between themselves and said temperature responsive element to a slightly higher temperature than those heating elements having a low thermal impedance between themselves and said temperature responsive element.

7. A constant temperature device in accordance with claim 6 comprising means for reducing temperature variations of the temperature of said container due to variations in the temperature of different portions of the surface of said device which comprises a thermal casing having a plurality of alternate layers of thermal insulating material and thermal conducting material surrounding said container, heating elements and temperature responsive element.

8. A constant temperature oven comprising a container, a heating element adjacent said container, temperature responsive means within the walls of said container connected to said heating element, a thermal attenuator lining the inside of said container comprising alternate layers of heat conducting and non-conducting materials, and a thermal casing surrounding said container and heating element which has a relatively low thermal conductivity through said casing and a relatively high thermal conductivity around said casing which comprises alternate layers of a heat conducting material and a heat non-conducting material.

BURRELL STALLARD.